United States Patent [19]

Levijoki

[11] 4,316,144
[45] Feb. 16, 1982

[54] INTEGRAL MECHANICAL AND ELECTRICAL VEHICLE SPEED SENSOR

[75] Inventor: Wayne A. Levijoki, Clio, Mich.

[73] Assignee: General Motors Corporation, Detroit, Mich.

[21] Appl. No.: 96,847

[22] Filed: Nov. 23, 1979

[51] Int. Cl.³ ............................ G01P 3/48; G01P 3/54
[52] U.S. Cl. .................................................. 324/174
[58] Field of Search ............. 324/166, 173, 174, 175, 324/160, 163, 207, 208; 123/414, 418; 74/12; 310/67

[56] References Cited

U.S. PATENT DOCUMENTS

| | | | |
|---|---|---|---|
| 3,458,741 | 7/1969 | Woodward | 324/174 |
| 3,710,158 | 1/1973 | Bachle et al. | 310/156 |
| 3,710,246 | 1/1973 | Herring | 324/174 |
| 4,074,157 | 2/1978 | Lace | 310/67 R |

Primary Examiner—Gerard R. Strecker
Assistant Examiner—Walter E. Snow
Attorney, Agent, or Firm—Warren D. Hill

[57] ABSTRACT

To provide an electrical vehicle speed signal as well as a traditional speedometer cable drive, a sleeve member for mounting in a port of the transmission housing and a driven gear on a shaft journaled in the sleeve member are modified by providing a magnet on the gear for rotation therewith, an annular sensing coil around the sleeve member and a U-shaped polepiece linked through the coil and extending into magnetic coupling relationship with the magnet so that electrical pulses are induced in the coil upon gear rotation.

2 Claims, 3 Drawing Figures

INTEGRAL MECHANICAL AND ELECTRICAL VEHICLE SPEED SENSOR

This invention relates to vehicle speed sensors and particularly to a combined electrical and mechanical speed sensor.

In an automotive vehicle having a traditional mechanical speedometer driven by a speedometer cable which is driven in turn by the vehicle transmission, it is desirable to obtain an electrical indication of vehicle speed, as well, for the purpose of controlling certain automotive functions. An electronic automatic transmission control is one function, for example, which would utilize an electrical speed signal. It has been proposed to provide an electric speed transducer driven by the speedometer cable, say at either end. Experience has shown that such transducers provide higher quality electrical signals when they are located at or near the transmission rather than near the speedometer end of the cable. In many automotive vehicles space restrictions make it highly impractical to place a speed transducer on the speedometer cable outside the transmission housing.

It is therefore a general object of this invention to provide an electrical speed transducer having a drive mechanism in common with that of the speedometer cable and having only minimal space requirements outside the transmission housing. It is a further object of the invention to provide such a speed transducer integral with the speedometer cable drive inside the transmission housing.

The invention is carried out by providing a mechanical speedometer cable drive having a sleeve member for mounting in a port of a transmission and having a shaft journaled therein which carries a gear driven by the transmission at vehicle speed and further providing an annular sensing coil around the inner portion of the sensors sleeve, a magnet mounted on the gear for rotation in a path adjacent the coil and a polepiece extending through the sensing coil and to the magnet path for coupling magnetic flux from the magnetic to the coil so that electrical pulses are induced in the coil by the moving magnet.

The above and other advantages will be made more apparent from the following specification taken in conjunction with the accompanying drawings wherein like reference numerals refer to like parts and wherein.

Figure 1:
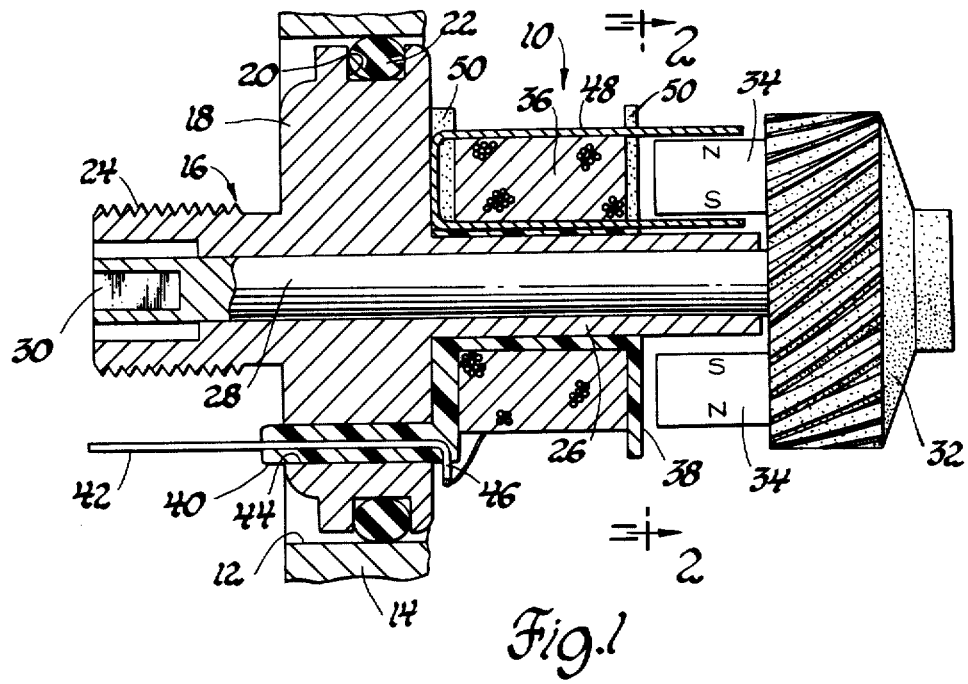
FIG. 1 is a cross-sectional view of an integral mechanical and electrical speed sensor according to the invention.
Figure 2:
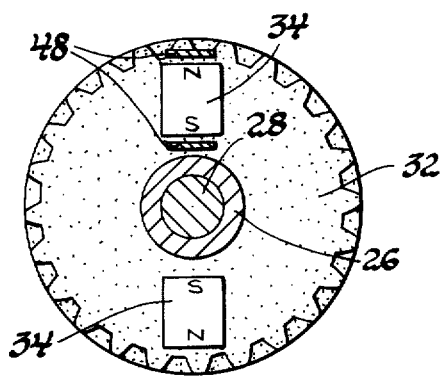
FIG. 2 is a cross-sectional view taken along line 2—2 of FIG. 1.
Figure 3:
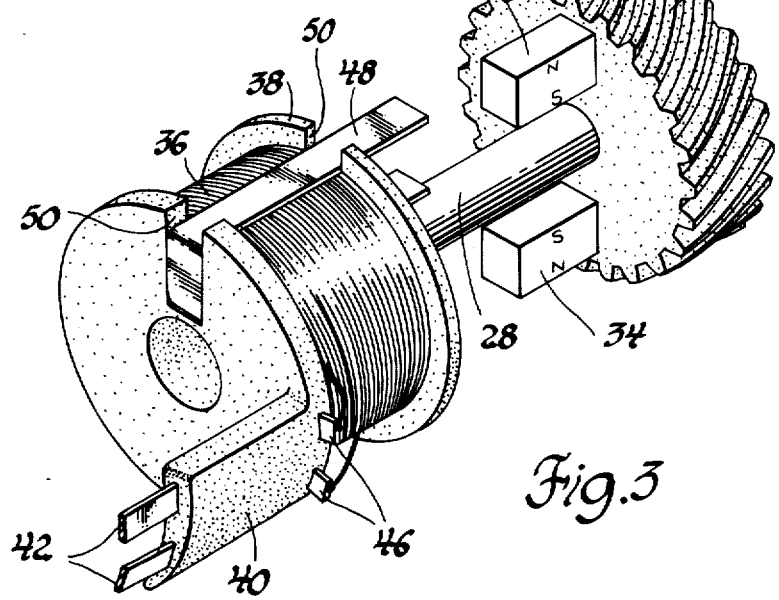
FIG. 3 is a perspective exploded view of the gear and coil arrangement of the apparatus of FIG. 1.

As shown in the drawings a transmission speedometer adaptor 10 comprises a mechanical and electrical speed sensor combined for mounting in a port 12 of a transmission housing 14. A sleeve member 16 includes an enlarged hub portion 18 having an annular groove 20 about its periphery which contains an O-ring 22 for sealing engagement in the port 12. An externally threaded axial extension 24 on the hub 18 provides a screw attachment for connecting a traditional speedometer flex cable thereto. Thus, the extension 24 projects toward the outside of the transmission. A sleeve 26 extends axially from the hub 18 into the interior of the transmission and provides an ample bearing surface for a shaft 28 which extends axially through the sleeve member 16. The outer end of the shaft 28 is provided with a square cross section cavity 30 for receiving a mating end of a speedometer cable core so that the shaft 28 is adapted to rotatably drive the core. The inner end of the shaft 28 carries a molded gear typically of plastic material such as nylon which is the driven gear 32 rotated at a speed proportional to vehicle speed by a gear member of the transmission, not shown. The gear 32 is mounted to the shaft 28 in any manner suitable to rotatably drive the shaft 28. The mechanism as described thus far is conventional for mechanical speedometer drive adaptors.

An electrical speed sensor is incorporated within the transmission between the hub 18 and the gear 32. Two magnets 34 are secured to the face of the gear 32 nearest the hub 18 on opposite sides of the shaft. The north pole of each magnet is near the toothed surface of the gear while the south pole of each magnet faces toward the axis of rotation. The polarity may be reversed, if desired. The magnets 34 are attached to the gear 32 by any desired means. An annular coil 36 wound on a plastic bobbin or spool 38 surrounds a portion of the sleeve 26 adjacent the hub 18 on one side and adjacent the magnet 34 on the other side. A lateral projection 40 from the spool 38 is molded integral therewith and contains a pair of terminal blades 42 which extend axially outward from the sleeve member 16 radially spaced from the threaded extension 34. An aperture 44 in the hub 18 tightly receives the extension 40 to allow the blades 42 to extend through the hub. The inner ends of the blades 42 are L-shaped to provide tabs 46 extending radially from the spool 38 for connection to the two ends of the coil 36, thus completing a circuit between the coil 36 and the terminals 42. A U-shaped polepiece 48 of magnetic material is received in mating notched areas 50 in the spool such that the polepiece extends around one side of the coil 36 and the legs of the polepiece straddle the path of the magnets so that the outer leg will lie adjacent the north poles and the inner leg will lie adjacent the south poles of the magnets 34 as the gear 32 rotates. Thus, the polepiece which is made of a high permeability material forms a flux path linking the coil 36 whenever a magnet 34 is aligned with or bridges the legs of the polepiece.

In operation, as the gear 32 rotates and as each magnet 34 passes between the legs of the polepiece 48, a voltage pulse is induced in the coil 36 to thereby generate a signal at the terminals 42 having a frequency proportional to the speed of the gear 32. While two magnets 34 are illustrated, only one magnet is necessary to produce the electrical signal. While that arrangement would give one electrical pulse per gear revolution, multiple pulses can be obtained by using several magnets or by using several polepieces. The amplitude of the electrical signal at a given speed can be increased by providing both multiple magnets and multiple polepieces arranged for coincident coupling of the magnets with the coil to thereby boost the flux linkage with the coil.

An advantage of the electrical speed sensor of this invention is that the moving magnet arrangement produces greater changes of flux and thus larger induced voltages with a given magnet and coil as compared to commonly used variable reluctance speed sensors. As a result, a lower coil impedance, say less than 100 ohms, can be used. A high impedance coil has the drawback that when operating in a salt water environment, waterproof connectors must be used at the terminals 42 to prevent effective shorting of the coil. A low impedance coil, on the other hand, will function properly in spite of the presence of salt water even without waterproof connectors. Thus, the arrangement according to this invention has the economic advantage of the use of standard terminal hardware even where exposed to salt water.

Further, it will be seen that the speed sensor according to this invention provides an electrical speed signal without adding any mass outside the transmission housing other than an electrical connector.

The embodiments of the invention in which an exclusive property or privilege is claimed are defined as follows:

1. A combined electrical and mechanical speed sensor for mounting in the speedometer cable drive port of a vehicle transmission housing for driving engagement with a transmission driving gear therein to produce an electrical speed signal and a rotary mechanical speed output, comprising
   a sleeve member adapted for mounting in a transmission housing cable drive port including an inner portion adapted to extend into the housing,
   a shaft rotatably journalled in the sleeve member and having an inner end adapted to extend into the housing and an outer end adapted to connect to a speedometer cable,
   a driven gear fixed on the inner end of the shaft adjacent the said sleeve member inner portion and adapted to drivingly couple the shaft to the said transmission driving gear,
   an annular sensing coil surrounding the inner portion of the sleeve member and mounted thereon,
   at least one magnet mounted on the driven gear for rotation therewith in a path adjacent the sensing coil, and
   at least one polepiece extending through the sensing coil and to the magnet path for coupling magnetic flux from the magnet to the sensing coil,
   whereby a pulsed electrical signal having a frequency proportional to the rotational speed of the driven gear is induced in the sensing coil and a mechanical speed output is provided at the outer end of the shaft.

2. A combined electrical and mechanical speed sensor for mounting in the speedometer cable drive port of a vehicle transmission housing for driving engagement with a transmission driving gear therein to produce an electrical speed signal and a rotary mechanical speed output, comprising
   a sleeve member having a hub adapted for mounting in a transmission housing cable drive port including an inner sleeve adapted to extend from the hub into the housing,
   a shaft rotatably journalled in the sleeve member and having an inner end adapted to extend into the housing and an outer end adapted to connect to a speedometer cable,
   a driven gear fixed on the inner end of the shaft adjacent the said inner sleeve and adapted to drivingly couple the shaft to the said transmission driving gear,
   an annular sensing coil surrounding the inner sleeve and mounted thereon between the hub and the driven gear,
   at least one magnet mounted on the driven gear for rotation therewith in a path adjacent the sensing coil, and
   at least one U-shaped polepiece linked through the sensing coil and having its legs respectively positioned adjacent the paths of opposite magnet poles for coupling magnetic flux from the magnet to the sensing coil when the magnet bridges the polepiece legs,
   whereby a pulsed electrical signal having a frequency proportional to the rotational speed of the driven gear is induced in the sensing coil and a mechanical speed output is provided at the outer end of the shaft.

* * * * *